US008432116B2

(12) United States Patent
Furuta et al.

(10) Patent No.: US 8,432,116 B2

(45) Date of Patent: Apr. 30, 2013

(54) TORQUE MOTOR DRIVING DEVICE FOR WIRE CUT ELECTRICAL DISCHARGE MACHINES

(75) Inventors: Tomoyuki Furuta, Yamanashi (JP); Akiyoshi Kawahara, Yamanashi (JP); Masao Murai, Yamanashi (JP)

(73) Assignee: Fanuc Corporation (JP)

( * ) Notice: Subject to any disclaimer, the term of this patent is extended or adjusted under 35 U.S.C. 154(b) by 242 days.

(21) Appl. No.: 13/038,437

(22) Filed: Mar. 2, 2011

(65) Prior Publication Data

US 2012/0001577 A1 Jan. 5, 2012

(30) Foreign Application Priority Data

Jul. 1, 2010 (JP) ................................ 2010-150789

(51) Int. Cl.

*H02P 7/00* (2006.01)
*B23H 7/00* (2006.01)
*G05B 11/28* (2006.01)

(52) U.S. Cl.

USPC ........... 318/432; 318/434; 318/689; 318/280; 318/6; 318/810; 318/599; 318/811; 318/801; 318/369; 219/69.12; 219/69.18; 219/69.15; 219/69.13; 219/69.2; 320/166; 320/167; 700/159; 700/160; 363/59; 363/60; 222/412.1; 222/412.3; 222/413.2; 222/413.4; 222/413.6

(58) Field of Classification Search .................. 318/432, 318/434, 599, 689, 6, 280, 369, 801, 800, 318/811; 219/69.12, 69.18, 69.15, 69.13, 219/69.2; 320/166, 167; 700/159, 160, 162; 363/59, 60

See application file for complete search history.

(56) References Cited

U.S. PATENT DOCUMENTS 4,156,162 A * 5/1979 Warfield et al. ............... 318/434
4,711,981 A * 12/1987 Aso et al. ................... 219/69.12
4,762,974 A * 8/1988 Kern ......................... 219/69.12
5,006,692 A * 4/1991 Magara et al. ............ 219/69.12
5,077,457 A * 12/1991 Onaka et al. ............... 219/69.12
5,306,888 A * 4/1994 Kaneko et al. ............ 219/69.12
5,306,889 A * 4/1994 Kaneko et al. ............ 219/69.12
5,523,545 A * 6/1996 Maidagan .................. 219/69.12
6,130,395 A * 10/2000 Kaneko et al. ............ 219/69.12
6,789,721 B2 * 9/2004 Stilwell et al. ............ 228/110.1
2001/0035731 A1 11/2001 Luerkens

FOREIGN PATENT DOCUMENTS

EP 1429450 A1 6/2004
EP 2034605 A1 3/2009
JP 7060552 3/1995

OTHER PUBLICATIONS

An EP Search Report, dated Jul. 13, 2012, issued in EP Application No. 11156037.1.

* cited by examiner

*Primary Examiner* — Rita Leykin

(74) *Attorney, Agent, or Firm* — Lowe Hauptman Ham & Berner, LLP

(57) ABSTRACT

In a torque motor driving device for wire cut electrical discharge machines, a voltage waveform rectified by a full-wave rectifying circuit, not using a high-capacitance electrolytic capacitor, is applied as an AC voltage to a single-phase torque motor by a bridge circuit including semiconductor switches. A PWM signal whose duty is adjusted so that the current flowing through the torque motor matches an instructed value is generated and the generated PWM signal is used for the operation of the bridge circuit.

5 Claims, 7 Drawing Sheets

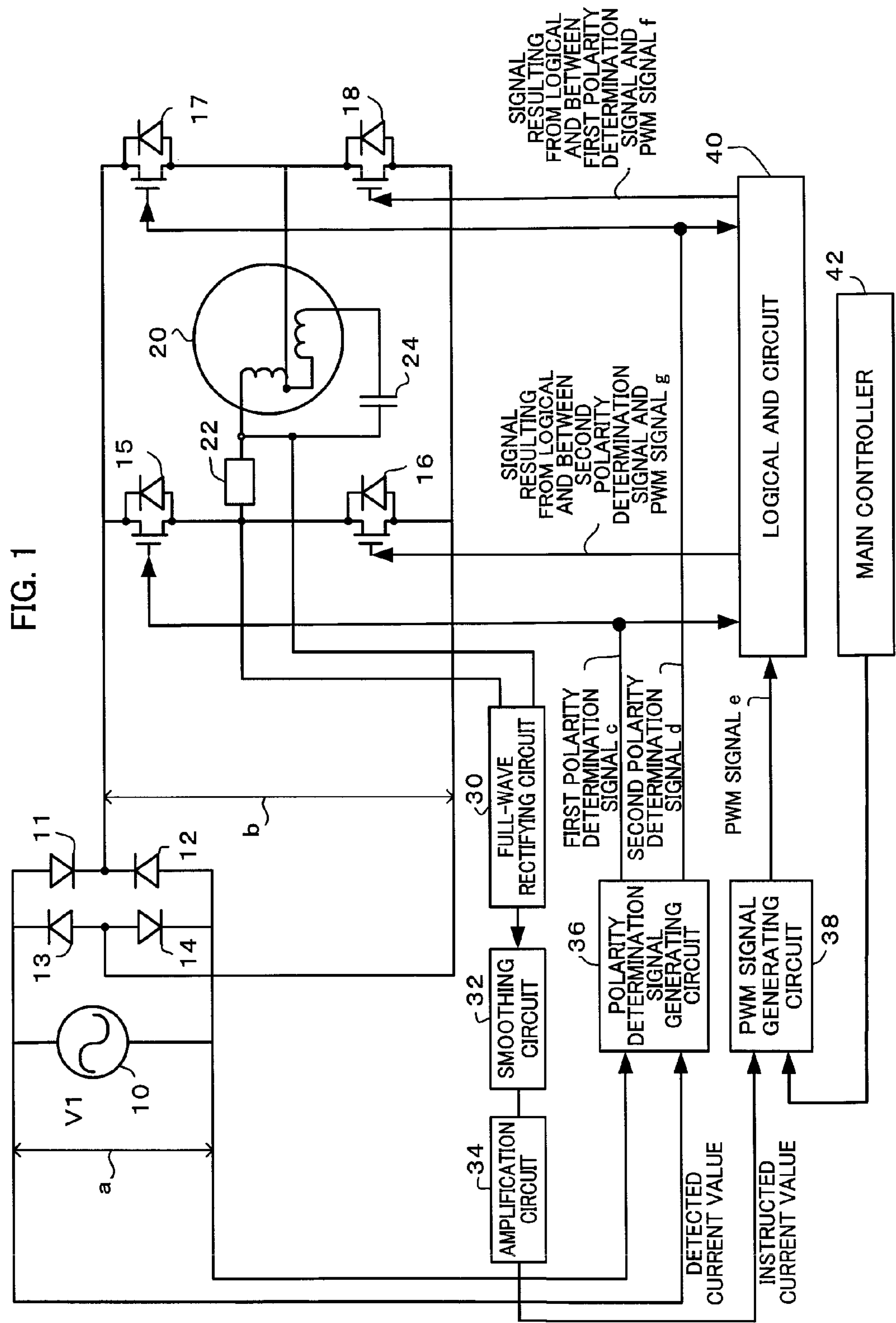
FIG. 1
V1
10
a
b
11
12
13
14
15
16
17
18
20
22
24
30
FULL-WAVE RECTIFYING CIRCUIT
32
SMOOTHING CIRCUIT
34
AMPLIFICATION CIRCUIT
36
POLARITY DETERMINATION SIGNAL GENERATING CIRCUIT
38
PWM SIGNAL GENERATING CIRCUIT
40
LOGICAL AND CIRCUIT
42
MAIN CONTROLLER
DETECTED CURRENT VALUE
INSTRUCTED CURRENT VALUE
FIRST POLARITY DETERMINATION SIGNAL c
SECOND POLARITY DETERMINATION SIGNAL d
PWM SIGNAL e
SIGNAL RESULTING FROM LOGICAL AND BETWEEN SECOND POLARITY DETERMINATION SIGNAL AND PWM SIGNAL g
SIGNAL RESULTING FROM LOGICAL AND BETWEEN FIRST POLARITY DETERMINATION SIGNAL AND PWM SIGNAL f FIG. 9
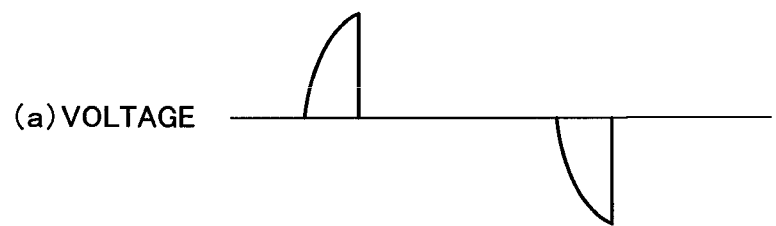
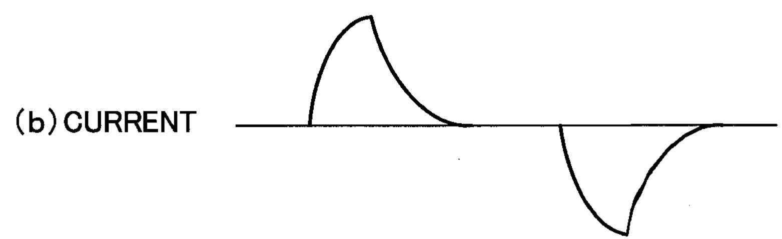
FIG. 10
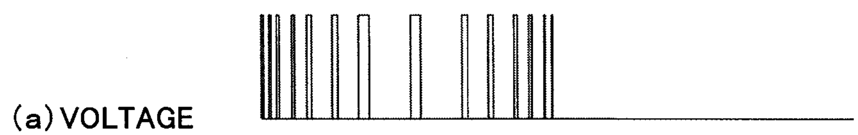
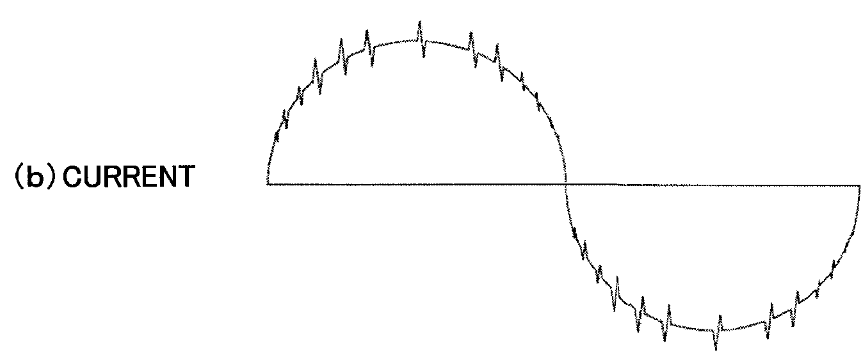

TORQUE MOTOR DRIVING DEVICE FOR WIRE CUT ELECTRICAL DISCHARGE MACHINES

RELATED APPLICATIONS

The present application is based on, and claims priority from, Japanese Application Number 2010-150789, filed Jul. 1, 2010, the disclosure of which is hereby incorporated by reference herein in its entirety.

BACKGROUND OF THE INVENTION

1. Field of the Invention

The present invention relates to a torque motor driving device for wire cut electrical discharge machines that drives a torque motor with an AC power source.

2. Description of the Related Art

A torque motor is best suited for feeding or winding the wire electrode of a wire cut electrical discharge machine. In a wire cut electrical discharge machine, an appropriate torque is generally applied to the shaft to which the wire electrode bobbin is attached, in the direction opposite to the wire electrode feed direction, to prevent the wire electrode from being loosened. In known use of a torque motor in a wire cut electrical discharge machine described in, for example, Japanese Patent Application Publication No. 7-60552, a used wire electrode is not stored in a recovery box, and a wire electrode recovery bobbin driven by a torque motor is disposed on the wire electrode feed unit, so that the wire electrode can be recovered efficiently while the tension is kept constant by controlling the torque motor.

The wire electrode is generally 0.02 mm (minimum wire electrode diameter) to 0.40 mm (maximum wire electrode diameter) in diameter. A thick wire electrode requires a large torque because the bobbin is large and heavy and the inertia is large. A thin wire electrode requires a small torque because the bobbin is small and light, the inertia is small, and a torque large enough to break the wire electrode cannot be applied. As described above, the output torque of a torque motor needs to be adjusted properly depending on the diameter of a wire electrode to be used.

A torque motor is a type of induction motor and, when rotating so as to be pulled in a direction opposite to that of a torque generating on the output shaft, the effective current flowing through the motor is approximately proportional to the torque generating on the output shaft, regardless of the number of revolutions. Accordingly, to obtain a desired torque, the AC voltage to be applied to the motor needs to be changed so that the current corresponding to the torque flows. To generate torques corresponding to the range from the maximum wire electrode diameter to the minimum wire electrode diameter described above, the effective voltage needs to be changed to a value from approximately 5% to 100% of the rated voltage of the motor.

As a circuit that changes the AC voltage of a torque motor, a driving circuit adopting the resistor voltage divider method was used conventionally. In recent years, however, a driving circuit adopting the triac method has been used.

FIG. 6 schematically shows a torque motor driving circuit by the resistor voltage divider method. The resistor voltage divider method divides the power voltage V1 of an AC power source 10 using resistors 51, 52, 53, 54, and 55 and a single-phase torque motor 20, and performs switching using relays 61, 62, 63, 64, and 65, so that unnecessary voltages are applied to the resistors. In the resistor voltage divider method, it is necessary to prepare the resistors and relays required to apply a set voltage across the single-phase torque motor 20. Because power is consumed by the resistors, a plurality of large-size power resistors are necessary, thereby increasing the device size. In addition, problems are that cost is high, a large loss of power is caused, and the output torque of the single-phase torque motor 20 changes depending on the power voltage V1 of an AC power source 10.

FIG. 7 schematically shows a torque motor driving circuit by the triac method. The triac method obtains a desired torque by changing the firing angle of a triac 68 to change the effective voltage to be applied to the single-phase torque motor 20. The triac method can reduce a loss of power and make a current to be applied to a torque motor coincide with an instructed value even in an area where a different power voltage is used by feeding back a detected current value to a firing angle control circuit (not shown). However, since control by this method is limited to the commercial frequency of the AC power source 10, especially when a low torque is required, the firing angle becomes low and, as shown in FIG. 9, the ratio of the OFF time of the voltage to be applied to the single-phase torque motor 20 becomes much larger than that of the ON time. As a result, fluctuations in a current flowing through the single-phase torque motor 20 become large as shown in FIG. 9B and the number of torque fluctuations for each turn increases.

To suppress torque fluctuations in the triac method, an inverter can be used to change the number of revolutions of the motor. An inverter is generally used to control the number of revolutions of an AC motor. AC power is converted into DC power by a converter and a voltage to be applied to the motor is converted into AC power again by a bridge circuit including semiconductor switches. The so-called PWM control is allowed, in which the effective frequency of a motor is changed by determining the rotation frequency from several hertz to tens of hertz and the switching frequency of tens of kilohertz and changing the duty at which the semiconductor switch is turned ON and OFF within the switching frequency.

FIG. 8 schematically shows a torque motor driving circuit by the inverter method. The torque motor driving circuit by the inverter method full-wave rectifies the AC voltage of the AC power source 10 using a diode bridge converter including a first diode 11, a second diode 12, a third diode 13, and a fourth diode 14 and then smoothes and converts the rectified voltage into a DC voltage using an inductor 70 and a high-capacitance electrolytic capacitor 72. The DC voltage is converted into an AC voltage again by an inverter including a first FET 15, a second FET 16, a third FET 17, and a fourth FET 18, and the AC voltage is applied to the single-phase torque motor 20.

A PWM signal generating circuit 76 changes the ON/OFF duty of the PWM signal to make the detected current value that a means (not shown) obtains by detecting the current flowing through the motor coincide with the instructed current value, so that the current value matches the instructed current value and the desired torque can be obtained even when power fluctuations occur as shown in FIG. 10 or even in an area in which a different power voltage (such as 200 V or 220 V) is used. In addition, since the OFF time can be significantly reduced than in the triac method, the current flowing through the coil of the single-phase the torque motor 20 becomes continuous and torque fluctuations are reduced.

However, since the voltage to be applied to the single-phase torque motor 20 is the DC voltage converted by the converter, if the switching frequency and the duty of the PWM signal are fixed, voltage fluctuations caused when the polarity of the voltage is reversed become sharp, thereby causing torque fluctuations. Accordingly, a PWM/rotation frequency signal synthesizing circuit 78 has a duty adjusting circuit 79, which adjusts the duty of switching depending on the phase of the rotation frequency so that the current waveform becomes sinusoidal as shown in FIG. 10 to prevent torque fluctuations. This duty adjusting circuit 79 is a complicated circuit that gradually increases the duty so that the phase of the rotation frequency has the minimum value at 0 degrees and the maximum value at 90 degree and reduces the duty so that the phase has the minimum value at 180 degrees. On the other hand, an high-speed FET with a small ON resistance can be used as the semiconductor switch to reduce a loss of power.

Since the resistor voltage divider method or triac method of the prior art has large torque fluctuations and other problems as described above, use of an inverter with less torque fluctuations can be considered. However, this method also has disadvantages. That is, the converter unit that converts AC power into DC power generally uses the high-capacitance electrolytic capacitor 72 (see FIG. 8) to store the electrical energy required to supply the full-wave rectified DC voltage to the motor.

The electrolytic capacitor 72 greatly reduces its capacitance over time and the reduction causes much heat generation due to charge and discharge, possibly causing explosion or liquid leakage. Accordingly, the electrolytic capacitor 72 needs to have a large capacitance. However, a high-capacitance electrolytic capacitor is large and expensive. To ensure long term reliability, it is necessary to give a higher priority to long term reliability by increasing the capacitance or give a higher priority to the size and const by reducing capacitance margins.

For the single-phase torque motor 20, the rated power frequencies are generally 50 Hz and 60 Hz. The rotation frequency can be fixed to 50 Hz or 60 Hz, but a circuit that adjusts the duty of the switching depending on the phase of the rotation frequency is required to obtain a sinusoidal current waveform that prevents torque fluctuations and this circuit is complicated and expensive.

SUMMARY OF THE INVENTION

The present invention addresses the above problems with the object of providing a torque motor driving device for wire cut electrical discharge machines that can output a low torque stably, has long term reliability and a low production cost, and drives a torque motor with an AC power source.

A torque motor driving device for wire cut electrical discharge machines according to the present invention includes a full-wave rectifying circuit connected to the AC power source, a bridge circuit connected between a rectification output of the full-wave rectifying circuit and the torque motor, a polarity determination signal generating circuit that detects a period during which an absolute value of a power voltage of the AC power source exceeds a first reference voltage in a period during which a polarity of the power voltage of the AC power source is positive and outputs a detection result as a first polarity determination signal and detects a period during which the absolute value of the power voltage of the AC power source exceeds a second reference voltage in a period during which the polarity of the power voltage of the AC power source is negative, a PWM signal generating circuit that generates a PWM signal whose duty is adjusted according to a physical quantity corresponding to a torque of the torque motor, and a logical AND circuit that obtains a logical AND between the PWM signal output from the PWM signal generating circuit and the first and second polarity determination signals output from the polarity determination signal generating circuit. The bridge circuit includes a positive polarity switch group having two or more semiconductor switches that applies a positive voltage to the torque motor and a negative polarity switch group having two or more semiconductor switches that applies a negative voltage to the torque motor. In addition, at least one of the semiconductor switches included in the positive polarity switch group operates according to a signal of a logical AND between the first or second polarity determination signal and the PWM signal and the other semiconductor switches operate according the first or second polarity determination signal. At least one of the semiconductor switches included in the negative polarity switch group operates according to a signal of a logical AND between the second or first polarity determination signal and the PWM signal and the other semiconductor switches operate according the second or first polarity determination signal.

The physical quantity corresponding to the torque of the torque motor can be any one of (1) an effective value of a current waveform of a current that flows into the torque motor or an average value obtained by full-wave rectifying the current waveform, (2) an effective value of a voltage waveform of a voltage applied to the torque motor or an average value obtained by full-wave rectifying the voltage waveform, (3) a shaft torque of an output shaft of the torque motor, and (4) a tension of a wire electrode. The duty of the PWM signal may be changed so that the physical quantity matches an instructed value that is input to a driving circuit for the torque motor.

An instructed value data table for the torque motor may be provided for each wire electrode diameter and data corresponding to set wire electrode diameter information may be retrieved from the instructed value data table and the data is input to the torque motor driving circuit as an instructed value.

When set power frequency information does not match a frequency in the instructed value data table for the torque motor, a value in the instructed value data table may be multiplied by a coefficient that has a predetermined initial value and that is changeable later, and a multiplication result may be input to the torque motor driving circuit as an instructed value.

The instructed value data table for the torque motor for each wire diameter may be provided for each of a first frequency and a second frequency that is different from the first frequency, and the data table for the first frequency or the data table for the second frequency may be selected depending on the set power frequency information.

According to the present invention, it is possible to provide a torque motor driving device that can output a low torque stably and has long term reliability and a low production cost.

BRIEF DESCRIPTION OF THE DRAWINGS

FIG. 1 is schematically shows an embodiment of a single-phase torque motor driving circuit according to the present invention, which controls the detected current value obtained by detecting a current flowing through a single-phase torque motor so as to match an instructed current value.

FIG. 9A shows an example of the voltage waveform and FIG. 9B shows an example of the current waveform of a torque motor by the triac method.

FIG. 10A shows an example of the voltage waveform and FIG. 10B shows an example of the current waveform of a torque motor by the inverter method.

DETAILED DESCRIPTION OF THE PREFERRED EMBODIMENTS

Figure 2:
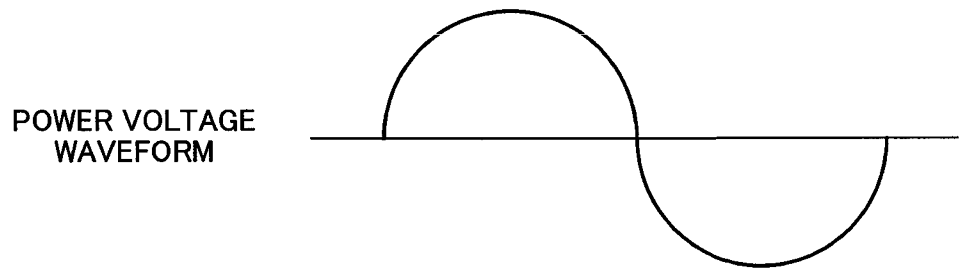
FIG. 2 shows an example of the voltage waveform of an AC voltage supplied from the AC power source in FIG. 1.

A torque motor driving circuit according to the present invention applies a voltage waveform rectified by a full-wave rectifying circuit to a torque motor as an AC voltage using a bridge circuit including a semiconductor switch, instead of using a high-capacitance electrolytic capacitor. This facilitates application of a sinusoidal voltage waveform similar to the power voltage waveform to a single-phase torque motor without using a complicated circuit that adjusts the duty of switching depending on the phase of the rotation frequency used in an inverter. The voltage to be applied to the single-phase torque motor can be adjusted even in an area where a different power voltage to obtain a desired torque as in the inverter by generating a PWM signal whose duty is adjusted so that the current flowing through the single-phase torque motor matches the instructed value and using the generated PWM signal to operate the bridge circuit.

An embodiment of the invention will be described below with reference to the drawings. Elements identical or similar to those of the prior art are indicated by identical reference numerals.

FIG. 1 is shows an embodiment of a single-phase torque motor driving circuit according to the present invention, which controls the detected current value obtained by detecting the current flowing through a single-phase torque motor 20 so as to match an instructed current value.

An AC power source 10 in FIG. 1 supplies an AC voltage V1 with the power voltage waveform shown in FIG. 2. The power voltage waveform in FIG. 2 is the same as that in FIG. 4A described later.

A main controller 42 has a function of totally controlling a wire cut electrical discharge machine and has the same configuration (not shown) as in a known control unit for wire cut electrical discharge machines, which has an central processing unit (CPU), an input/output means, a recording means, a display means, etc. A first diode 11, a second diode 12, a third diode 13, and a fourth diode 14 constitute a diode bridge circuit. The power voltage V1 of the AC voltage supplied from the AC power source 10 is full-wave rectified by the diode bridge circuit. The full-wave rectified waveform is shown in FIG. 4B.

Figure 4:
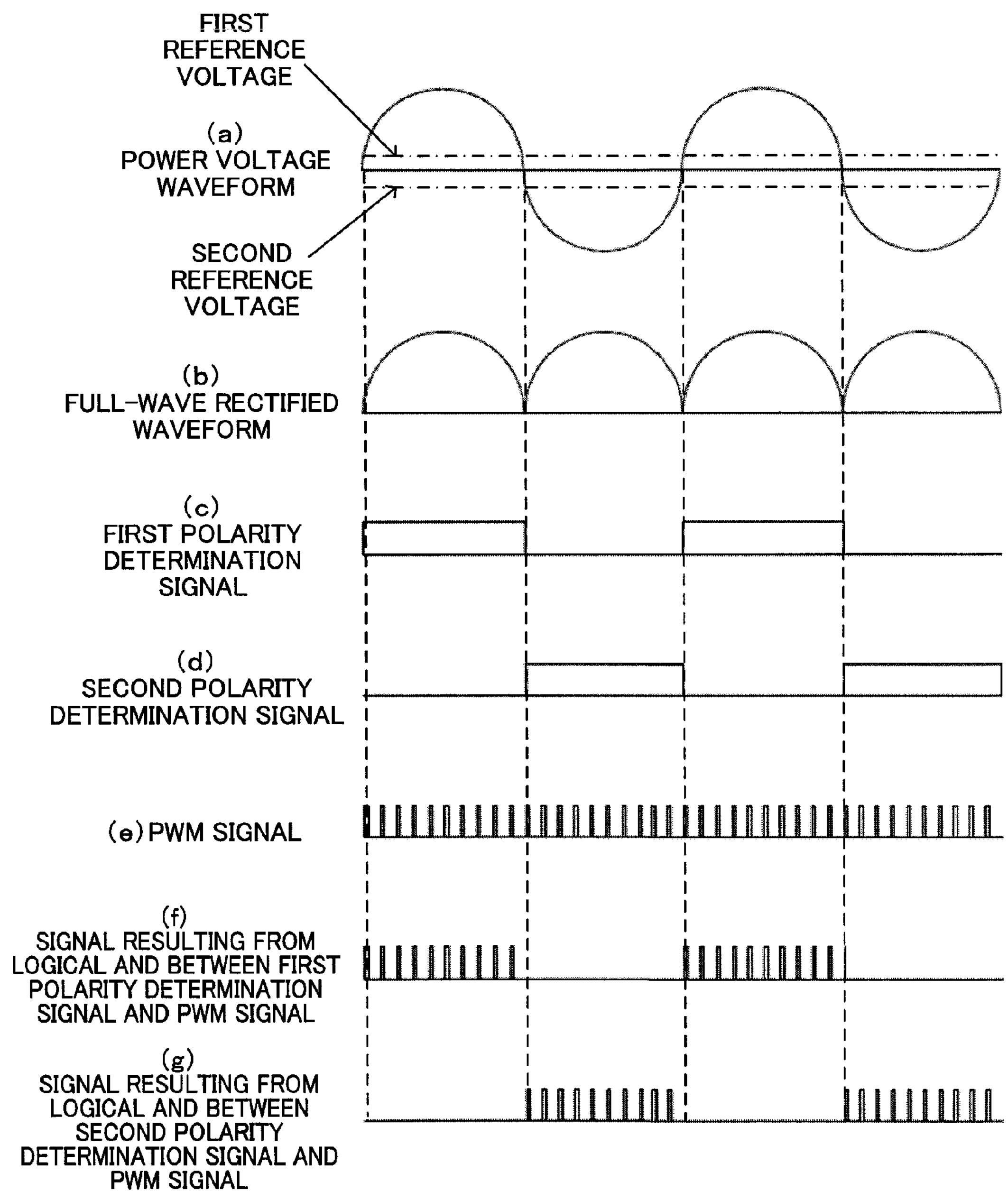
FIG. 4A shows an example of the voltage waveform of the AC voltage supplied from the AC power source in FIG. 1.
FIG. 4B shows an example of a rectified waveform obtained by full-wave rectifying the AC voltage with a diode bridge circuit in FIG. 1.
FIG. 4C shows an example of a first polarity determination signal to be output in the period in which the polarity of the AC voltage is detected as positive.
FIG. 4D shows an example of a second polarity determination signal to be output in the period in which the polarity of the AC voltage is detected as negative.
FIG. 4E shows an example of a PWM signal generated by a PWM signal generating circuit in FIG. 1.
FIG. 4F shows an example of a signal resulting from a logical AND between the first polarity determination signal in FIG. 4C and the PWM signal in FIG. 4E.
FIG. 4G shows an example of a signal resulting from a logical AND between the second polarity determination signal in FIG. 4D and the PWM signal in FIG. 4E.

A voltage with the full-wave rectified waveform in FIG. 4B is applied to the single-phase torque motor 20 via a semiconductor bridge circuit including a first FET 15, a second FET 16, a third FET 17 and a fourth FET 18.

The first FET 15 and the fourth FET 18 constitute a positive polarity switch group, which applies a positive voltage to the single-phase torque motor 20. The second FET 16 and the third FET 17 constitute a negative polarity switch group, which applies a negative voltage to the single-phase torque motor 20. Here, an FET is an acronym for field effect transistor.

A resistor 22 is inserted in series with the single-phase torque motor 20, the voltage applied to the resistor 22 is full-wave rectified by a full-wave rectifying circuit 30 and smoothed by a smoothing circuit 32, and the DC voltage (detected voltage value) obtained by the smoothing is detected. The waveform of the current flowing through the resistor 22 is similar to that in FIG. 3B and the waveform of the voltage across the resistor 22 is also similar to that in FIG. 3B.

Since the resistance of the resistor 22 is known, the circuit constant of an amplification circuit 34 is set so that the current (detected current value) flowing through the single-phase torque motor 20 can be a detected from the detected voltage value. This detected current value is input to a PWM signal generating circuit 38 as the average current value of the single-phase torque motor 20. The PWM signal generating circuit 38 generates a PWM signal e whose ON/OFF duty is changed so that the detected current value matches the instructed current value (see FIG. 4E).

A polarity determination signal generating circuit 36 compares the power voltage V1 (see FIG. 4A) of the AC power source 10 with a first reference voltage, detects the period of the positive polarity, and generates a first polarity determination signal c (see FIG. 4C). Similarly, the polarity determination signal generating circuit 36 compares the power voltage V1 with a second reference voltage, detects the period of the negative polarity, and generates a second polarity determination signal d (see FIG. 4D). The polarity determination signal generating circuit 36 can use, for example, a comparator IC (not shown) to perform these comparison operations. The first polarity determination signal c may indicate the negative polarity period and the second polarity determination signal d may indicate the positive polarity period.

Figure 5:
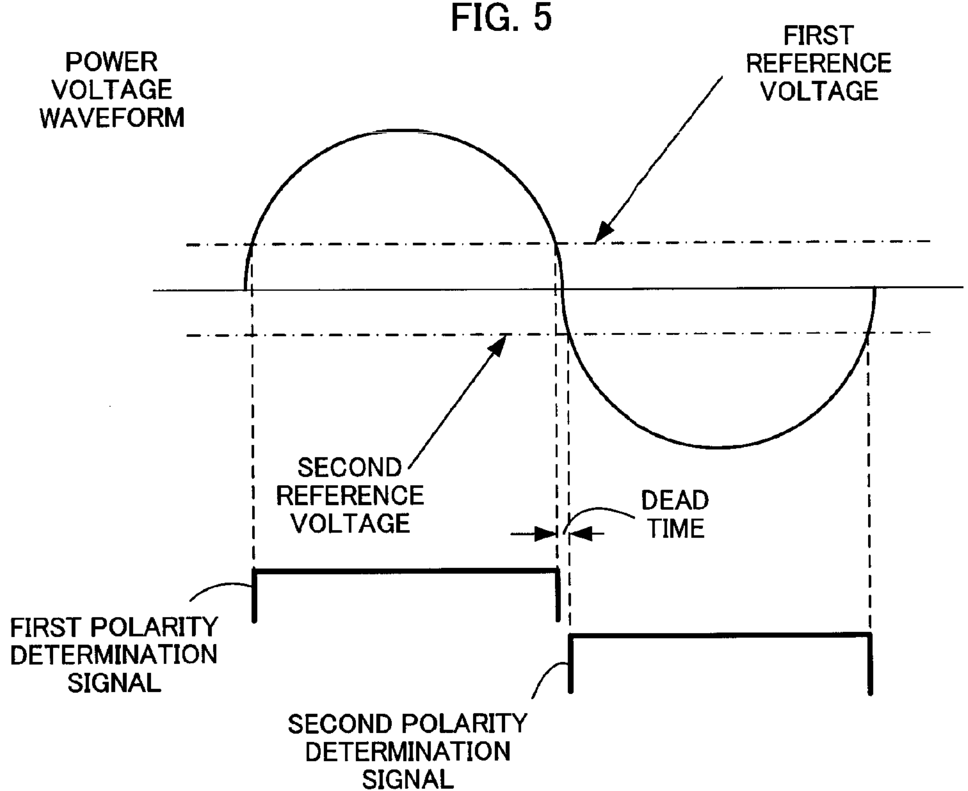
FIG. 5 shows that the first polarity determination signal in FIG. 4C and the second polarity determination signal in FIG. 4D are both placed in the low state in the period in which the power voltage of the AC power source in FIG. 1 is between a first reference voltage and a second reference voltage to provide a dead time.
Figure 6:
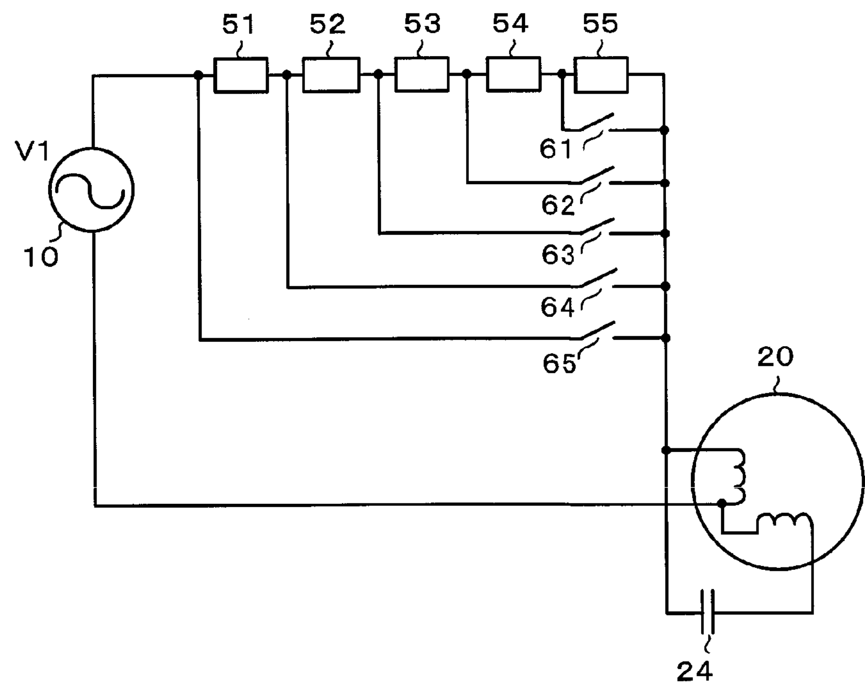
FIG. 6 schematically shows a torque motor driving circuit by the resistor voltage divider method of the prior art.
Figure 7:
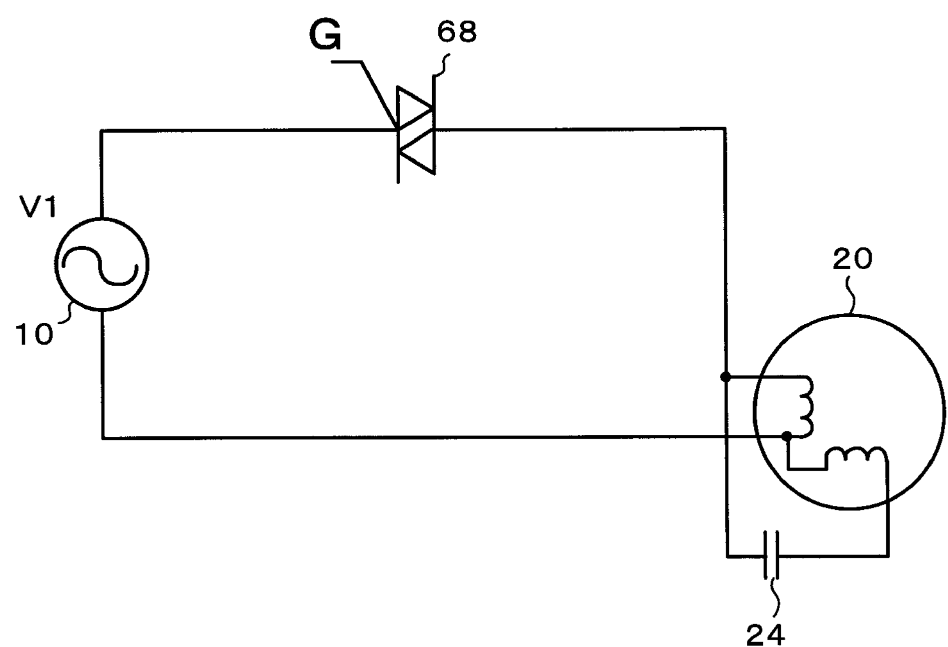
FIG. 7 schematically shows a torque motor driving circuit by the triac method of the prior art.
Figure 8:
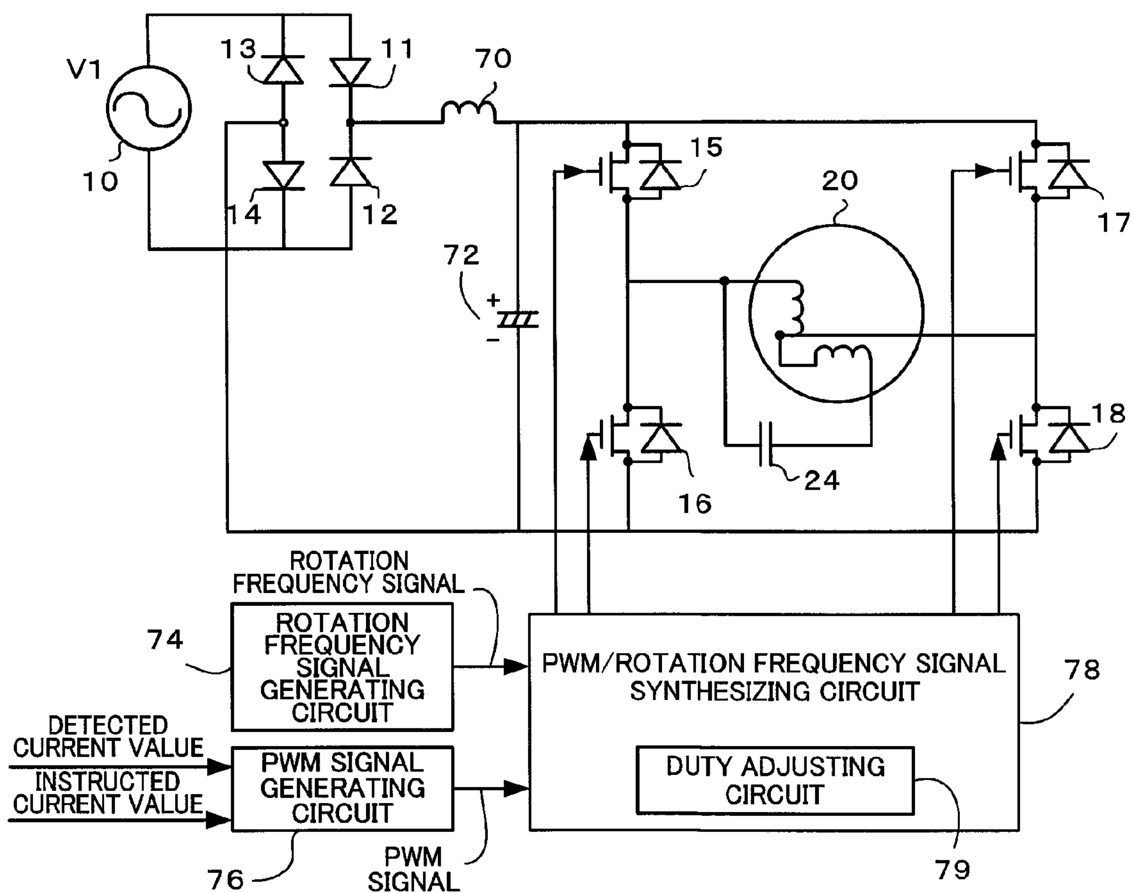
FIG. 8 schematically shows a torque motor driving circuit by the inverter method of the prior art.

Since the first polarity determination signal c and the second polarity determination signal d are both placed in the low state in the period in which the power voltage V1 of the AC power source 10 is between the first reference voltage and the second reference voltage, a dead time can be provided (see FIG. 5). This prevents the rectification voltage from being short-circuited by concurrent operation of the positive polarity switch group and the negative polarity switch group.

The first polarity determination signal c output from the polarity determination signal generating circuit 36 is input to the first FET 15 included in the positive polarity switch group and a logical AND circuit 40. Similarly, the second polarity determination signal d output from the polarity determination signal generating circuit 36 is input to the third FET 17 included in the negative polarity switch group and the logical AND circuit 40. The logical AND circuit 40 calculates the logical AND between the first polarity determination signal c and the PWM signal e and the logical AND between the second polarity determination signal d and the PWM signal e.

Figure 3:
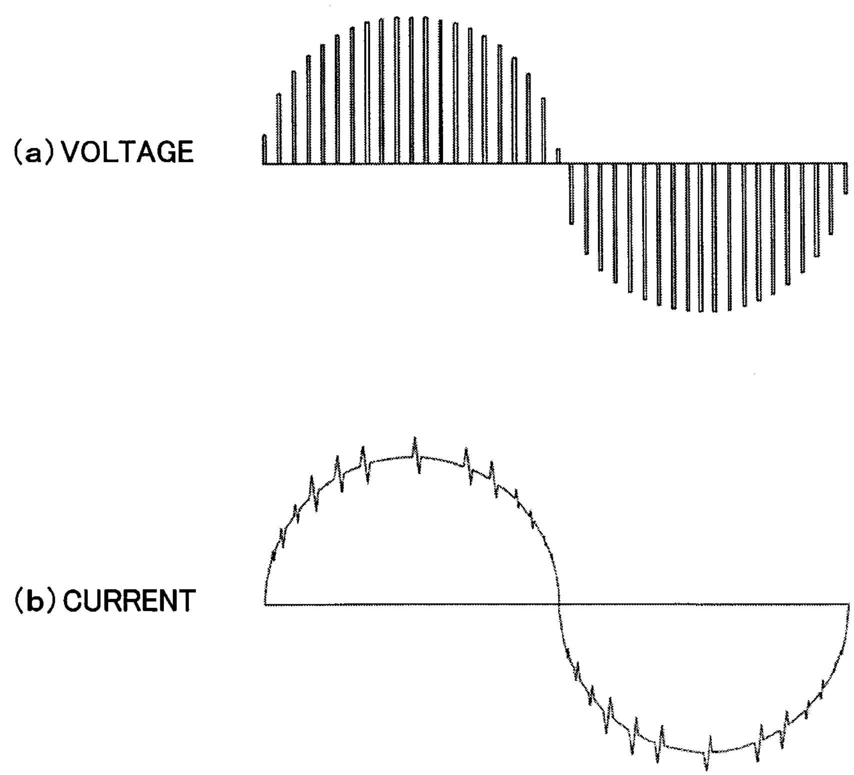
FIGS. 3A and 3B show an example of the waveform of a voltage applied to the signal-phase torque motor in FIG. 1 and an example of the waveform of a current flowing through the signal-phase torque motor.

The fourth FET 18 in the positive polarity switch group is operated on the basis of the logical AND (see FIG. 4F) between the first polarity determination signal c and the PWM signal e resulting from the logical AND circuit 40. The first FET 15 in the positive polarity switch group is operated by the first polarity determination signal c. The second FET 16 in the negative polarity switch group is operated on the basis of the logical AND (see FIG. 4G) between the second polarity determination signal d and the PWM signal e resulting from the logical AND circuit 40. The third FET 17 in the negative polarity switch group is operated by the second polarity determination signal d. Accordingly, the voltage shown FIG. 3A is applied to the single-phase torque motor 20 and the current shown in FIG. 3B flows through the single-phase torque motor 20. The current flowing through the single-phase torque motor 20 is obtained by detecting the voltage across the resistor 22.

The fourth FET 18 may be replaced with the first FET 15, and the third FET 17 may be replaced with the second FET 16. The third FET 17 of the negative polarity switch group instead of the positive polarity switch group may be operated on the basis of the logical AND between the first polarity determination signal c and the PWM signal e, and the second FET 16 may be operated by the first polarity determination signal. The fourth FET 18 of the positive polarity switch group instead of the negative polarity switch group may be operated on the basis of the logical AND between the second polarity determination signal d and the PWM signal e, and the first FET 15 may be operated by the second polarity determination signal. Alternatively, all the FETs in the positive and negative polarity switch groups may be operated only by the logical AND between the first and second polarity determination signals c and d and the PWM signal e. When each of the first FET 15, the second FET 16, the third FET 17, and the fourth FET 18 includes a plurality of FETs connected in parallel because, for example, the rated currents of the FETs 15 to 18 are small, the plurality of FETs connected in parallel may be operated by the same signal.

According to the embodiment of the present invention, it is possible to provide a torque motor driving circuit that can easily apply a sinusoidal switched voltage to a torque motor without using a high-capacitance smoothing capacitor or a circuit adjusting the duty of switching depending on the phase of the rotation frequency used in the inverter, that can output even a low torque stably, and that has long term reliability and a low production cost.

In addition, a circuit that detects the current of the single-phase torque motor 20 and adjusts the duty of the PWM signal e is disposed, so that a desirable torque that depends on the diameter of a wire electrode can be obtained even in an area in which the power voltage V1 is different. As in the inverter, an high-speed FET or other component with a small resistance is used as the semiconductor switch, so that a loss of power can be reduced to a small value.

In the above embodiment of the present invention, the resistor 22 is inserted in series with the single-phase torque motor 20, the resistance across the resistor 22 is measured, the effective value of the current waveform applied to the single-phase torque motor 20 and the average value obtained by full-wave rectifying the current waveform are obtained, and these values are used as physical quantities for determining the duty of the PWM signal e.

Other than this, there are a method that measures the output voltage of the torque motor driving circuit, a method that measures the shaft torque of the shaft to which the single-phase torque motor 20 is fixed, and a method that measures the tension of the wire electrode. The shaft torque can be estimated from the amount of strain obtained by placing a torque detector between the single-phase torque motor 20 and the fixed shaft or attaching a strain gauge to the output shaft of the single-phase torque motor 20. The tension of the wire electrode can be estimated by placing a tension detector in the running path of the wire electrode drawn from the wire bobbin or estimated from the load current of the motor that pulls the wire electrode.

The control unit for wire cut electrical discharge machines has an instructed value data table for the single-phase torque motor 20 for each wire electrode diameter, retrieves the data corresponding to set wire electrode diameter information from the instructed value data table, and inputs the data to the driving circuit of the torque motor as an instructed value.

The instructed value table for the single-phase torque motor 20 is for 50 Hz or 60 Hz. If the different power frequency information is set, the value in the instructed value data table is multiplied by a coefficient that has a predetermined initial value and can be changed later and the resulting value is input to the torque motor driving circuit as an instructed value.

The instructed value data table for the torque motor 20 for each wire diameter may be provided for each of 50 Hz and 60 Hz, and the instructed value data table for 50 Hz or the instructed value data table for 60 Hz may be selected depending on the set power frequency information.

The above data tables can be stored in a recording means (not shown) included in the main controller 42.

The invention claimed is:

1. A toque motor driving device for wire cut electrical discharge machines that drives a torque motor using an AC power source, the toque motor driving device comprising:

a bridge circuit connected between a rectification output of the full-wave rectifying circuit and the torque motor;

a polarity determination signal generating circuit that detects a period during which an absolute value of a power voltage of the AC power source exceeds a first reference voltage in a period during which a polarity of the power voltage of the AC power source is positive and outputs a detection result as a first polarity determination signal and detects a period during which the absolute value of the power voltage of the AC power source exceeds a second reference voltage in a period during which the polarity of the power voltage of the AC power source is negative;

a PWM signal generating circuit that generates a PWM signal whose duty is adjusted according to a physical quantity corresponding to a torque of the torque motor;

and a logical AND circuit that obtains a logical AND between the PWM signal output from the PWM signal generating circuit and the first and second polarity determination signals output from the polarity determination signal generating circuit;

wherein the bridge circuit includes a positive polarity switch group including two or more semiconductor switches that applies a positive voltage to the torque motor and a negative polarity switch group including two or more semiconductor switches that applies a negative voltage to the torque motor;

wherein at least one of the semiconductor switches included in the positive polarity switch group operates according to a signal of a logical AND between the first or second polarity determination signal and the PWM signal and the other semiconductor switches operate according the first or second polarity determination signal;

wherein at least one of the semiconductor switches included in the negative polarity switch group operates according to a signal of a logical AND between the second or first polarity determination signal and the PWM signal and the other semiconductor switches operate according the second or first polarity determination signal.

2. The toque motor driving device for wire cut electrical discharge machines according to claim 1, wherein the physical quantity corresponding to the torque of the torque motor is any one of (1) an effective value of a current waveform of a current that flows into the torque motor or an average value obtained by full-wave rectifying the current waveform, (2) an effective value of a voltage waveform of a voltage applied to the torque motor or an average value obtained by full-wave rectifying the voltage waveform, (3) an shaft torque of an output shaft of the torque motor, and (4) a tension of a wire electrode, and the duty of the PWM signal is changed so that the physical quantity matches an instructed value input to a torque motor driving circuit.

3. The toque motor driving device for wire cut electrical discharge machines according to claim 2, wherein an instructed value data table for the torque motor is provided for each wire electrode diameter and data corresponding to set wire electrode diameter information is retrieved from the instructed value data table and the data is input to the torque motor driving circuit as an instructed value.

4. The toque motor driving device for wire cut electrical discharge machines according to claim 3, wherein, when set power frequency information does not match a frequency in the instructed value data table for the torque motor, a value in the instructed value data table is multiplied by a coefficient that has a predetermined initial value and that is changeable later, and a multiplication result is input to the torque motor driving circuit as an instructed value.

5. The toque motor driving device for wire cut electrical discharge machines according to claim 3, wherein the instructed value data table for the torque motor for each wire diameter is provided for each of a first frequency and a second frequency that is different from the first frequency, and the data table for the first frequency or the data table for the second frequency is selected depending on the set power frequency information.

* * * * *